United States Patent [19]

Yamashita et al.

[11] Patent Number: 5,012,697

[45] Date of Patent: May 7, 1991

[54] REVOLUTION CONTROLLER FOR A CONTINUOUSLY VARIABLE TRANSMISSION

[75] Inventors: Yoshinori Yamashita; Sadayuki Hirano; Katsuaki Murano, all of Shizuoka; Takumi Tatsumi; Hiroaki Yamamoto, both of Hyogo

[73] Assignees: Suzuki Jidosha Kogyo Kabushiki Kaisha, Shizuoka; Mitsubishi Denki Kabushiki Kaisha, Tokyo, both of Japan

[21] Appl. No.: 443,720

[22] Filed: Nov. 29, 1989

[30] Foreign Application Priority Data

Nov. 30, 1988 [JP] Japan .................. 63-302732

[51] Int. Cl.$^5$ .................. F16H 59/24; F16H 59/46
[52] U.S. Cl. .................. 74/866; 364/424.1; 474/12
[58] Field of Search .................. 474/18, 28; 74/866; 123/350, 352

[56] References Cited

U.S. PATENT DOCUMENTS

| | | | |
|---|---|---|---|
| 4,257,361 | 3/1981 | Kasiewicz | 123/352 |
| 4,458,318 | 7/1984 | Smit et al. | 364/424.1 |
| 4,475,416 | 10/1984 | Underwood | 74/868 |
| 4,493,303 | 1/1985 | Thompson et al. | 123/352 X |
| 4,594,916 | 6/1986 | Itoh et al. | 74/866 |
| 4,597,049 | 6/1986 | Murakami | 123/352 X |
| 4,603,668 | 8/1986 | Ueno | 123/352 |
| 4,653,004 | 3/1987 | Osanai et al. | 74/866 X |
| 4,656,587 | 4/1987 | Osanai et al. | 364/424.1 |
| 4,658,006 | 3/1987 | Osanai et al. | 74/866 X |
| 4,663,990 | 5/1987 | Itoh et al. | 74/866 |
| 4,683,779 | 8/1987 | Osanai et al. | 364/424.1 X |
| 4,689,745 | 8/1987 | Itoh et al. | 364/424.1 |
| 4,701,853 | 10/1987 | Osanai | 364/424.1 |
| 4,718,308 | 1/1988 | Haley | 74/866 |
| 4,753,133 | 6/1988 | Itoh et al. | 364/424.1 X |
| 4,872,115 | 10/1989 | Itoh et al. | 364/424.1 |
| 4,926,716 | 5/1990 | Hirano et al. | 74/866 |
| 4,956,972 | 9/1990 | Sasajima et al. | 364/424.1 X |

FOREIGN PATENT DOCUMENTS

| | | |
|---|---|---|
| 57-186656 | 11/1982 | Japan . |
| 59-43249 | 3/1984 | Japan . |
| 59-77159 | 5/1984 | Japan . |
| 61-233256 | 10/1986 | Japan . |

Primary Examiner—Allan D. Herrmann
Assistant Examiner—Khoi Q. Ta
Attorney, Agent, or Firm—Flynn, Thiel, Boutell & Tanis

[57] ABSTRACT

A continuously variable transmission includes a driving side pulley and a driven side pulley each having a fixed pulley part and having a movable pulley part supported for movement toward and away from the fixed pulley part, the width of a groove between the pulley parts of each pulley being increased and decreased to increase the decrease at each pulley the rotating radius of a belt wound around both of the pulleys to change a belt ratio. A revolution controller for the transmission limits the rate of change of a target number of revolutions for an engine driving the transmission to a rate limit lower than a prescribed rate when the target number of revolutions of the engine specified by a speed change schedule map based on a throttle opening and a vehicle speed is changed during travel of the vehicle.

4 Claims, 4 Drawing Sheets

REVOLUTION CONTROLLER FOR A CONTINUOUSLY VARIABLE TRANSMISSION

FIELD OF THE INVENTION

The present invention relates to a revolution controller for the engine for a continuously variable transmission and, more particularly, to such a revolution controller capable of preventing the actual number of engine revolutions from being abruptly changed when a target number of engine revolutions is changed during travel of the vehicle according to a change of travel mode or a change of the throttle opening.

BACKGROUND OF THE INVENTION

In a vehicle such as a car, a transmission is interposed between an internal combustion engine and a driving wheel. The transmission changes a driving force applied to and a travel speed of the driving wheel to meet travel conditions of the vehicle changing within a wide range, so as to optimize the performance of the internal combustion engine.

As this transmission, there are known a gear type transmission which changes gear ratios in discrete steps by selective switching of the engaged states of plural steps of gear trains, and also a continuously variable transmission for increasing and decreasing the width of a groove formed between the pulley parts of a driving side pulley and a driven side pulley which each have a fixed pulley part fixed to a rotating shaft and a movable pulley part supported on the shaft for movement toward and away from the fixed pulley part to thereby increase and decrease the rotating radius at each pulley of a belt wound on the pulleys to thereby allow a continuous change of a belt ratio for transferring the driving force. Continuously variable transmissions of this type are disclosed for instance in Japanese Patent Laid Open Publication Nos. 186656/1982, 43249/1984, 77159/1984, and 233256/1986.

In the conventional continuously variable transmission, an arrangement controls an actual belt ratio to be a target belt ratio determined by a speed change schedule map based on the throttle opening and the number of engine revolutions, or controls the actual number of engine revolutions to be a target number of revolutions determined by a change schedule map based on the throttle opening and vehicle speed. In the continuously variable transmission controlling the actual number of engine revolutions toward a target number, it is conventional that, when the target number of engine revolutions is changed according to a change in the travel mode or the throttle opening during travel of the vehicle, the filtered target number of engine revolutions (NESPF) obtained by applying a first order lag filter to the target number of engine revolutions (NESPR) is defined to be the final target number of engine revolutions (NESPRF), and then the actual number of engine revolutions (NE) is controlled to be such final target number of engine revolutions (NESPRF), as shown in FIG. 6.

In this case, the values of the filter are set separately for the characteristics of respective travel modes such as an economy travel mode (ECN), a power travel mode (POW), and a low travel mode (LOW). Namely, respective values of the filter are used for the economy travel mode (ECN) in the case of travelling on a flat road while maintaining a low fuel consumption, for the power travel mode (POW) in the case of sporty travel or adverse road travel, or for the low travel mode (LOW) in the case of travel on a slope or the like requiring the transfer of a high torque or engine braking.

Figure 6:
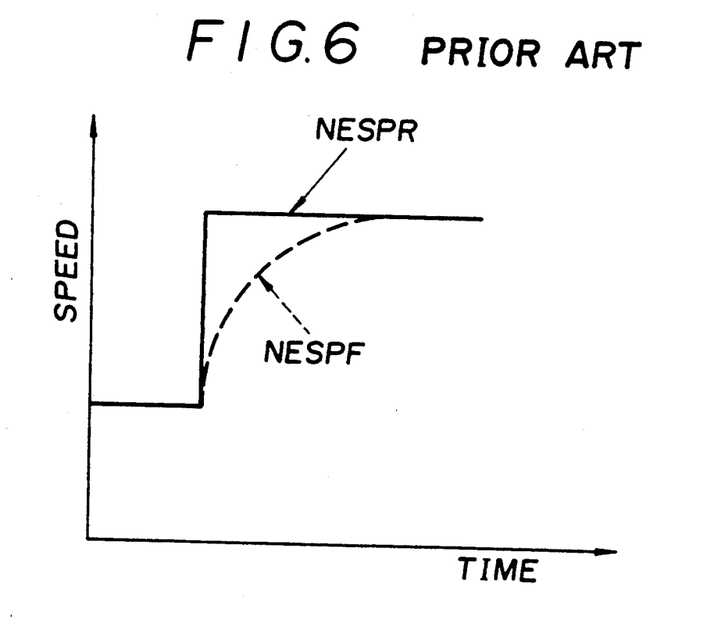
FIG. 6 is a graph showing a change over time in the target number of revolutions of an engine of a conventional system.

However, in the conventional continuously variable transmission revolution number controller, when the travel mode is changed or when the throttle opening is changed to a completely opened state during vehicle travel, the target number of engine revolutions (NESPR) is changed, as shown in FIG. 6, and causes the filtered target number of engine revolutions (NESPF) to be changed. In this case, a problem has been produced because the filtered target number of engine revolutions (NESPF) is changed at the highest rate of change immediately after the target number of engine revolutions (NESPR) is changed, which causes the actual number of engine revolutions (NE) to be abruptly changed.

Therefore, there is the inconvenience that the actual number of engine revolutions (NE) is quickly changed when the target number of engine revolutions is changed during travel of the vehicle, thereby giving to the driver an uneasy feeling as if the vehicle had slipped due to an incomplete transfer of the driving force. Further, there has been another inconvenience in that, since power is applied by the change in the actual number of engine revolutions (NE), it is difficult to control the belt ratio after the change of the target number of engine revolutions (NESPF). Further, there has been another inconvenience in that the change in the actual number of engine revolutions (NE) does not cause the power performance to be improved, but instead a shock or a noise is generated in case of a rapid shift down due to a quick opening of the throttle, thereby giving an uneasy feeling to the driver.

In order to overcome these inconveniences, one conventional approach was to set the value of the filter to a low value to slow the change in the number of engine revolutions, but of course the time required to reach the new target number of engine revolutions was lengthened, whereby the system response characteristic deteriorated and a delay to carry out a movement different from a driving operation was noticed at the same time, thereby giving an uneasy feeling to the driver.

A purpose of the present invention is to provide a revolution controller for a continuously variable transmission which prevents the actual number of engine revolutions from being rapidly changed when the target number of engine revolutions is changed according to a change in travel mode or a change in the throttle opening during travel of the vehicle, in particular by limiting the rate of change of the number of engine revolutions to be lower in some cases than a prescribed rate, thereby avoiding giving an uneasy feeling to the driver, improving power performance, reducing the generation of shock or noise due to a quick opening of the throttle, and improving the response characteristic.

SUMMARY OF THE INVENTION

In order to attain this purpose, the present invention provides a rotation controller for a continuously variable transmission which includes a driving side pulley and a driven side pulley each having a fixed pulley part and having a movable pulley part supported for movement toward and away from the fixed pulley part, the width of a groove between the pulley parts of each pulley being increased and decreased to increase and decrease the rotating radius at each pulley of a belt wound on both the pulleys to thereby change the belt ratio, the controller limiting the rate of change of the target number of engine revolutions to a rate lower than a prescribed rate of change when the target number of engine revolutions determined from a speed change schedule map based on the throttle opening and the vehicle speed is changed during travel of the vehicle.

According to the present invention, when the target number of engine revolutions determined by a speed change schedule map based on the throttle opening and vehicle speed is changed during travel of the vehicle, the target number of engine revolutions is controlled to limit the rate of change of the target number of engine revolutions to be lower than a prescribed rate of change, so that the actual number of engine revolutions can be prevented from being quickly changed, even when the target number of engine revolutions is changed due to the change in the travel mode or the change in the throttle opening during travel of the vehicle.

BRIEF DESCRIPTION OF THE DRAWINGS

The present invention will be explained in more detail with reference to the accompanying drawings, in which.

Figure 1:
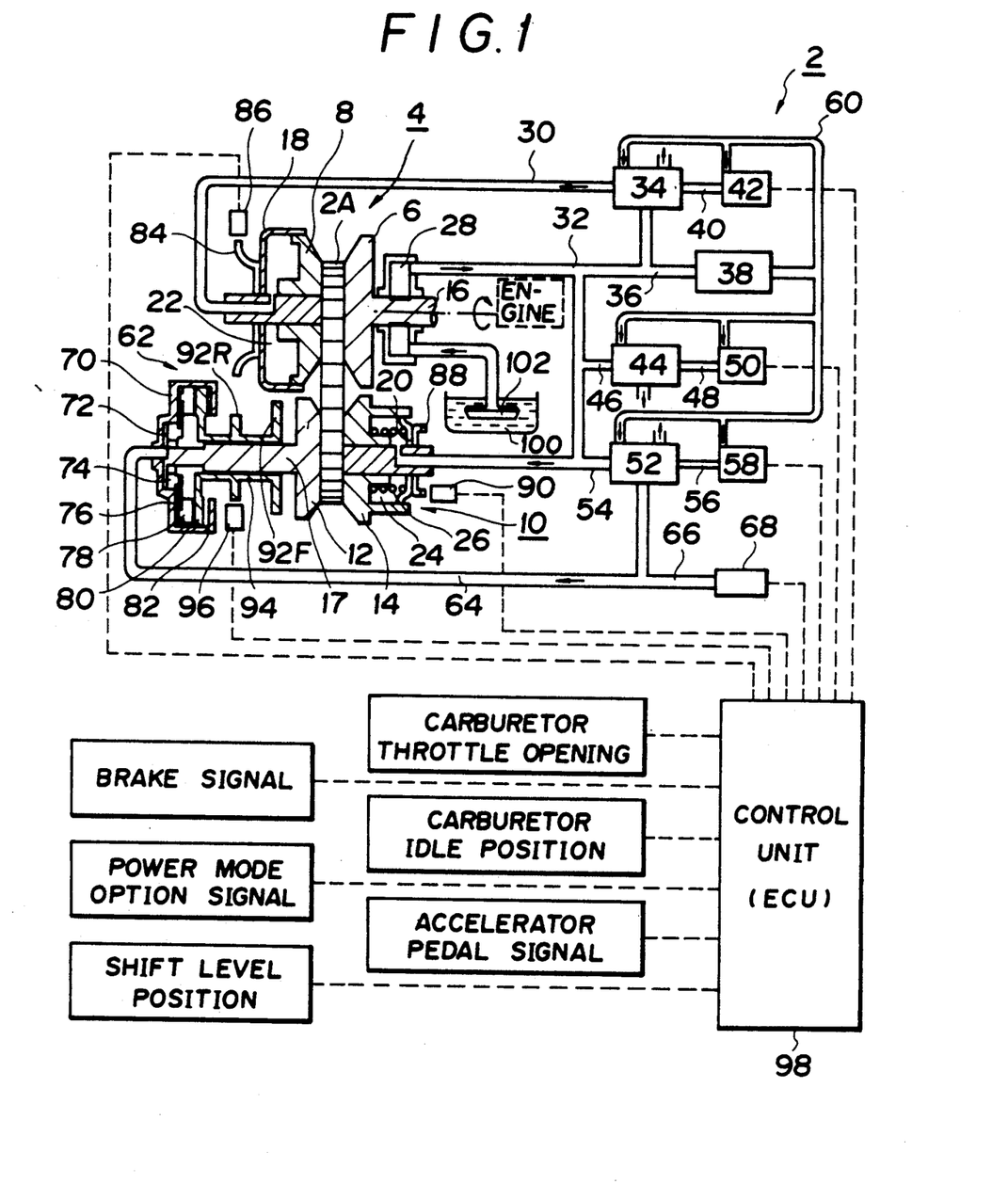
FIG. 1 is a block diagram of a continuously variable transmission embodying the present invention.

In FIG. 1, reference numeral 2 designates a belt driven type of continuously variable transmission, 2A a belt, 4 a driving side pulley, 6 a driving side fixed pulley part, 8 a driving side movable pulley part, 10 a driven side pulley, 12 a driven side fixed pulley part and 14 a driven side movable pulley part.

The driving side pulley 4 has the driving side fixed pulley part 6 fixed to a rotating input shaft 16, and the driving side movable pulley part 8 is axially movably supported on the shaft 16 so as not to rotate with respect to the shaft 16, and the driven side pulley 10 has its driven side fixed pulley part 12 and driven side movable pulley part 14 provided on an output shaft 17 in a manner similar to the provision of driving side pulley 4 on shaft 16.

First and second housings 18 and 20 are respectively mounted on the driving side movable pulley part 8 and the driven side movable pulley part 14 to respectively form first and second oil pressure chambers 22 and 24. The oil pressure receiving area on the driving side movable pulley part 8 in the first oil pressure chamber 22 is larger than the oil pressure receiving area on the driven side pulley part 14 in the second oil pressure chamber 24. The oil pressure applied to the first oil pressure chamber 22 is controlled to thereby change the belt ratio, which corresponds to a change of a gear ratio in a gear transmission. In the second oil pressure chamber 24 on the driven side, an energizing spring 26 urges the driven side movable pulley part in a direction reducing the width of a groove between the driven side fixed pulley part 12 and driven side movable pulley part 14. This energizing spring 26 urges the belt ratio to be high in order to produce a full low condition, maintains the holding power of the belt 2A, and prevents slip.

The shaft 16 drives an oil pump 28, and this oil pump 28 communicates with the first and the second oil chambers 22 and 24 through first and second oil passages 30 and 32 and a primary pressure control valve 34 which is part of a change gear control valve controlling the primary pressure for an input shaft sheave. A constant pressure control valve 38 generates from the line pressure at 32 (generally, 5 to 25 kg/cm$^2$) a constant control oil pressure at 60 (3 to 4 kg/cm$^2$) through a third oil passage 36. Communication between the second oil passage 32 and the first oil passage 30 is effected through a primary pressure control valve 34 which is controlled by a primary pressure controlling first three-way electromagnetic valve 42 through a fourth oil passage 40.

A line pressure control valve 44 having a relief valve function for controlling the line pressure or pump pressure communicates with the second oil passage 32 through a fifth oil passage 46, and is controlled by a line pressure controlling second three-way electromagnetic valve 50 through a sixth oil passage 48.

Further, a clutch pressure control valve 52 for controlling the clutch oil pressure applied to an oil pressure controlled clutch 62 communicates with the second oil passage 32 between the second oil chamber 24 and the line pressure control valve 44 through a seventh oil passage 54, and is controlled by a clutch pressure controlling third three-way electromagnetic valve 58 through an eighth oil passage 56.

The valves 38, 34, 42, 44, 50, 52 and 58 all communicate with the ninth oil passage 60, so as to supply the control oil pressure from the constant pressure control valve 38 to the primary pressure control valve 34, the primary pressure controlling first three-way electromagnetic valve 42, the line pressure control valve 44, the line pressure controlling second three-way electromagnetic valve 50, the clutch pressure control valve 52, and the clutch pressure controlling third three-way electromagnetic valve 58.

The clutch pressure control valve 52 communicates with the clutch oil pressure chamber 72 of the oil pressure controlled clutch 62 through a tenth oil passage 64. One end of the tenth oil passage 64 communicates with a pressure sensor 68 through an eleventh oil passage 66. This pressure sensor 68 detects the clutch oil pressure at the time of controlling the clutch pressure in a hold mode or a start mode and thus contributes to control of this detected oil pressure toward a target clutch pressure. At the time of a drive mode, valve 52 is open and the clutch pressure is equal to the line pressure, and sensor 68 thus contributes to line pressure control.

The oil pressure clutch 62 includes a casing 70 mounted on the shaft 17, a clutch oil pressure chamber 72 disposed in this casing 70, a piston 74 biased by the oil pressure acting in the clutch oil pressure chamber 72, an annular spring 76 for urging this piston 74 in a retreating direction, a first pressure plate 78 disposed so as to advance and retreat according to the pushing force of piston 74 and the energizing force of spring 76, a friction plate 80 of an output side, and a second pressure plate 82 fixed to the casing.

The oil pressure clutch 62, when the pressure of the oil in the clutch oil pressure chamber 72 is raised, pushes the piston 74 to cause tight contact of the first pressure plate 78 and second pressure plate 82 with the friction plate 80, to thereby couple them. When the clutch pressure of the oil pressure applied to the clutch oil chamber 72 is lowered, the piston retreats due to the energizing force of the annular spring 76 to separate the first plate 78 and the second pressure plate 82 from the friction plate 80, to thereby disengage the clutch. According to the engagement and disengagement of this oil pressure clutch 62, the driving force output from the continuously variable transmission 2 can be interrupted.

An input shaft rotation detecting gear 84 is disposed externally on the first housing 18, and a first rotation detector or sensor 86 for the input shaft is provided in the vicinity of the peripheral part of the rotation detecting gear 84. An output shaft rotation detecting gear 88 is disposed externally on the second housing 20, and a second rotation detector or sensor 90 for the output shaft is provided in the vicinity of the peripheral part of output shaft rotation detecting gear 88. The number of revolutions of the engine and the belt ratio are determined from the rotational speed detected by the first rotation detector 86 and the second rotation detector 90.

On the oil pressure clutch 62, an output power transferring gear 92 is provided. This output power transferring gear 92 includes a forward output power transferring gear 92F and a backward output power transferring gear 92R, and a third rotation detector 96 for detecting the rotational speed of a final clutch output shaft is installed in the vicinity of the peripheral part of the backward output power transferring gear 92R. The third rotation detector 96 detects the rotational speed of the final output shaft, which is coupled to a wheel (not shown in the drawing), and thus can detect the speed of the vehicle. Further, according to the rotational speeds detected by said second rotation detector 90 and the third rotation detector 96, the rotational speed of the input shaft and the output shaft of the oil pressure clutch 62 can be detected to contribute to detection of the amount of clutch slip.

An electronic control unit (ECU) 98 is provided and receives input signals indicating a carburetor throttle opening, a carburetor idle position, an accelerator pedal position, a brake pedal position, a power mode option selection, and respective positions of a shift lever. The control unit 98 controls the opening and closing of the primary pressure controlling first three-way electromagnetic valve 42, the line pressure controlling second three-way electromagnetic valve 50, and the clutch pressure controlling third three-way electromagnetic valve 58 to thereby control the belt ratio and degree of clutch engagement based on the respective input signals and in accord with respective control modes.

Reference numeral 100 indicates an oil pan, and 102 indicates an oil filter.

The functions of the input signals to the control unit 98 will be described in detail below.

1. Signal indicating shift lever position

Facilitates control of the line pressure, belt ratio, or clutch for respective ranges corresponding to respective position signals such as P, R, N, D and L.

2. Signal indicating carburetor throttle opening

Facilitates determination of an engine torque from data in a memory initialized by a program, and the determination of the target belt ratio or the target number of revolutions of the engine.

3. Signal indicating carburetor idle position

Facilitates correction of a carburetor throttle opening sensor signal and improvement of the accuracy of control.

4. Accelerator pedal position indicating signal

Indicates the intention of the driver as represented by the extent to which the accelerator pedal is pushed, and is used to effect control during travel or when starting travel.

5. Brake signal

Indicates the presence and absence of the pressing of a brake pedal to facilitate a control function such as disengagement of the clutch.

6. Power mode option signal

This signal from an optional user-controlled switch selects performance of the vehicle to be sporty power or economical performance.

The line pressure control valve 44 can effect a speed change control characteristic by implementing respective line pressures to produce a full low state, a full overdrive state, and a ratio state.

The primary pressure control valve 34 for controlling the primary pressure for the belt ratio or speed change control is controlled in its operation by the exclusive primary pressure controlling first three-way electromagnetic valve 42. This primary pressure controlling first three-way electromagnetic valve 42 controls the primary pressure control valve 34 so that it supplies the line pressure at 32 to the first oil passage 30 or supplies atmospheric pressure to passage 30. The primary pressure control valve 34 shifts the belt ratio to a full overdrive state by continuously supplying the line pressure 32 to the first oil passage 30, or shifts it to the full low state by continuously supplying atmospheric pressure to passage 30. By varying the duty ratio of the control signal for valve 42, valve 34 is made to alternately supply line pressure and atmospheric pressure to passage 30 in proportions dependent on the duty ratio, so that the pressure at 30 can be controlled by appropriately selecting the duty ratio.

The clutch pressure control valve 52 for controlling the clutch pressure continuously supplies the line pressure 32 to the tenth oil passage 64 at a time requiring maximum clutch pressure, and continuously supplies atmospheric pressure to passage 30 at a time requiring minimum clutch pressure. The operation of this clutch pressure control valve is controlled by the exclusive clutch pressure controlling third three-way electromagnetic valve 58 in a manner similar to control of the line pressure control valve 44 and the primary pressure control valve 34 by valves 50 and 42, and an explanation of such operation will thus be omitted.

The clutch pressure is changed within a range from a minimum or zero pressure (atmospheric pressure) to a maximum pressure (line pressure). There are four basic patterns for controlling this clutch pressure. These basic patterns are:

(1) Neutral mode

When the shift position is N or P, the clutch is completely disengaged by setting the clutch pressure to the minimum pressure.

(2) Hold mode

When the shift position is N or R and the throttle position shows no intention to travel, or when an engine torque is to be cut by slowing down during travel, the clutch pressure is set to a low level to effect partial engagement of the clutch.

(3) Start mode (Special start mode)

When engaging the clutch again at the time of starting vehicle movement (normal start) or after clutch disengagement (special start), the clutch pressure is set according to an engine generating torque (clutch input torque) to prevent blowing up of the engine and to provide a suitable level of engagement facilitating smooth operating of the vehicle.

(4) Drive mode

In a final travel state, the clutch is completely engaged and the clutch pressure has a level high enough to withstand the engine torque.

Of the foregoing patterns, the neutral mode (1) is executed by an exclusive changeover valve which is not illustrated and which is interlocked with the shift operation. The other patterns (2), (3) and (4) are executed by appropriate controlling of the duty ratios of control signals for the first, second and third three-way electromagnetic valves 42, 50 and 58 by the control unit 98. Especially, in the drive mode (4), the seventh oil passage 54 is in continuous communication with the tenth oil passage 64 through the clutch pressure control valve 52 to generate the maximum clutch pressure by making the clutch pressure the same as the line pressure.

The primary pressure control valve 34, the line pressure control valve 44 and the clutch pressure control valve 52 are respectively controlled by an oil pressure output from the first, second and third three-way electromagnetic valves 42, 50 and 58. The control oil pressure for three-way electromagnetic valves 42, 50 and 58 is a constant control oil pressure from the constant pressure control valve 38. This control oil pressure is always lower than the line pressure, and is a stable and constant pressure. The control oil pressure is supplied to the respective control valves 34, 44 and 52 to stabilize them.

In such a continuously variable transmission 2, the control unit 98 is designed to control the rate of change over time of the target number of revolutions of the engine so as to be able to set a rate lower than a prescribed rate of change.

The control by this control unit 98 will be explained according to FIGS. 2 to 5, where:

| | |
|---|---|
| NESPR: | Target number of revolutions of the engine obtained from a speed change schedule map |
| NESPF: | Filtered NESPR |
| NESPRF: | Final target number of revolutions of the engine |
| NESPRN: | Value of NESPRF in a preceding iteration of the control loop |
| RATE: | Rate of change over time of NESPRF |
| RATE LIMIT: | A prescribed maximum rate of change over time of NESPFR |
| RATEUP: | RATE LIMIT for an increasing NESPRF |
| RATELO: | RATE LIMIT for a decreasing NESPRF |
| NE: | Rotational speed of the engine |
| NCO: | Speed of the vehicle |
| THR: | Degree of opening of the throttle |
| ECN: | Economy travel mode |
| POW: | Power travel mode |
| LOW: | Low travel mode |
| DRV: | Drive control mode |

Figure 2:
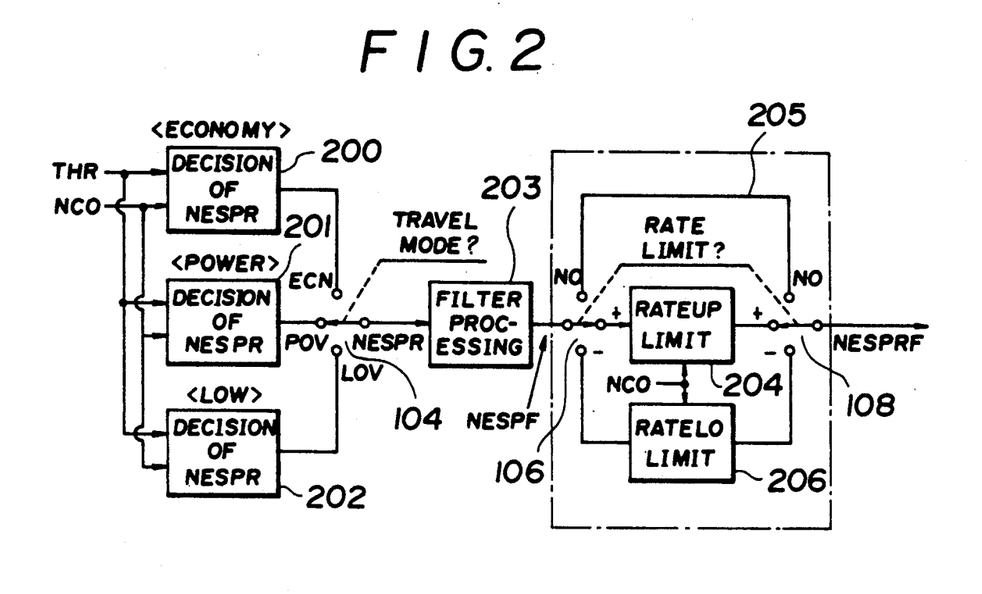
FIG. 2 is a block diagram of a control function implemented in the transmission of FIG. 1.

As shown in FIG. 2, the control unit 98 sets a first switching part 104 to one of the respective travel modes ECN, POW and LOW during travel of the vehicle in the drive mode. In the respective modes ECN, POW and LOW, NESPR is determined using the values of THR and NCO by respectively consulting (1) a speed change schedule map 200, (2) a speed change schedule map 201, or (3) a speed change schedule map 202. The NESPRs for ECN and POW specified by the speed change schedule maps of these respective travel modes are set with features for every travel mode.

NESPR is changed by a change in the travel mode, a change of THR or a change of NCO, but it is difficult to produce a rapid change of NCO, so a rapid change in NESPR usually results from a change in the travel mode and/or THR.

The selected NESPR is filtered (203) and NESPF is obtained as the filtered NESPR. When NESPR changes in a conventional system, the RATE of NESPF is always defined to be NESPRF as it is, but the result is an inconvenience in that it can produce a quick change in NE.

Figure 3:
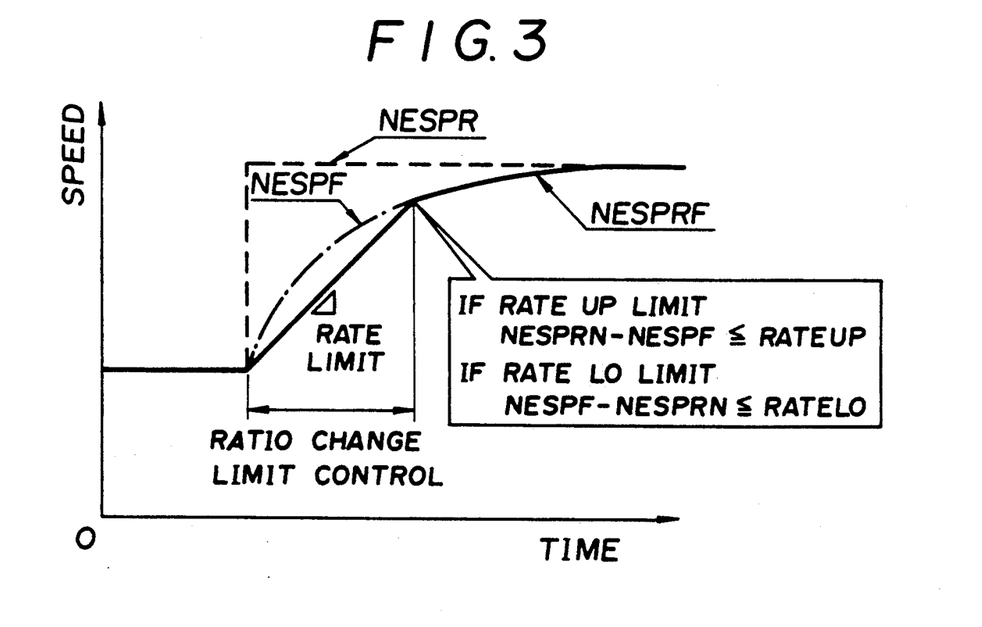
FIG. 3 is a graph showing a change over time in the target number of revolutions of an engine driving the transmission of FIG. 1.
Figure 5:
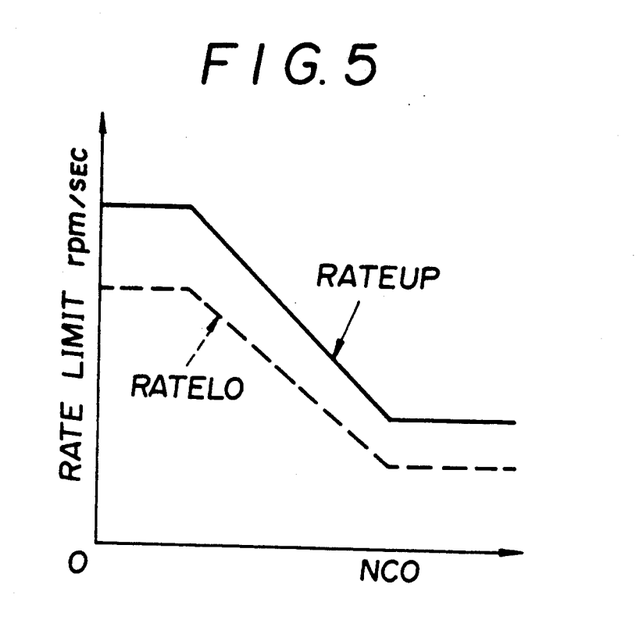
FIG. 5 is a graph showing a relation between the speed of the vehicle and allowable rate of change limits for the engine speed.

According to the present invention, the RATE of NESPF is controlled under certain circumstances to be lower than normal by using the RATE LIMIT. The RATE LIMIT, as shown in FIGS. 3 and 5, sets a RATEUP limit for an increasing NESPRF and a RATELO limit for a decreasing NESPRF. The RATE LIMIT is represented by the quantity of change of NESPRF per control loop, and its units are rpm/sec. NESPRN, which is the NESPRF from the preceding iteration of the control loop, is compared with the current NESPF, and a second switching part 106 and third switching part 108 are switched according to the result and according to whether NESPRF is increasing or decreasing.

Namely, if NESPF≧NESPRN, NESPRF is increasing. In this case, if NESPF−NESPRN>RATEUP, the second switching part 106 and third switching part 108 are each switched to "+" to limit the RATE of NESPRF to RATEUP (204). If NESPF−NESPRN≦RATEUP, the second switching part 106 and third switching part 108 each are switched to "NO" to cause the RATE of NESPRF to be NESPF as it is (205).

If NESPF<NESPRN, NESPRF is decreasing. In this case, if NESPRN−NESPRF>RATELO, the second switching part 106 and third switching part 108 are each switched to "−" to limit the RATE of NESPRF to RATELO (206). If NESPF−NESPRN≦RATELO, the second switching part 106 and third switching part 108 are each switched to "NO" to cause the RATE of NESPRF to be NESPF as it is (205).

In this way, when the target number of revolutions of the engine changes during travel of the vehicle, NESPRN is controlled so as to always be at or below the applicable RATE LIMIT regardless of NESPR as specified by the speed change schedule. Thereby, NESPRF is limited and linearly changed if NESPF is changing too fast, as shown in FIG. 3. Therefore, the actual number of revolutions of the engine can be prevented from being rapidly changed.

Figure 4:
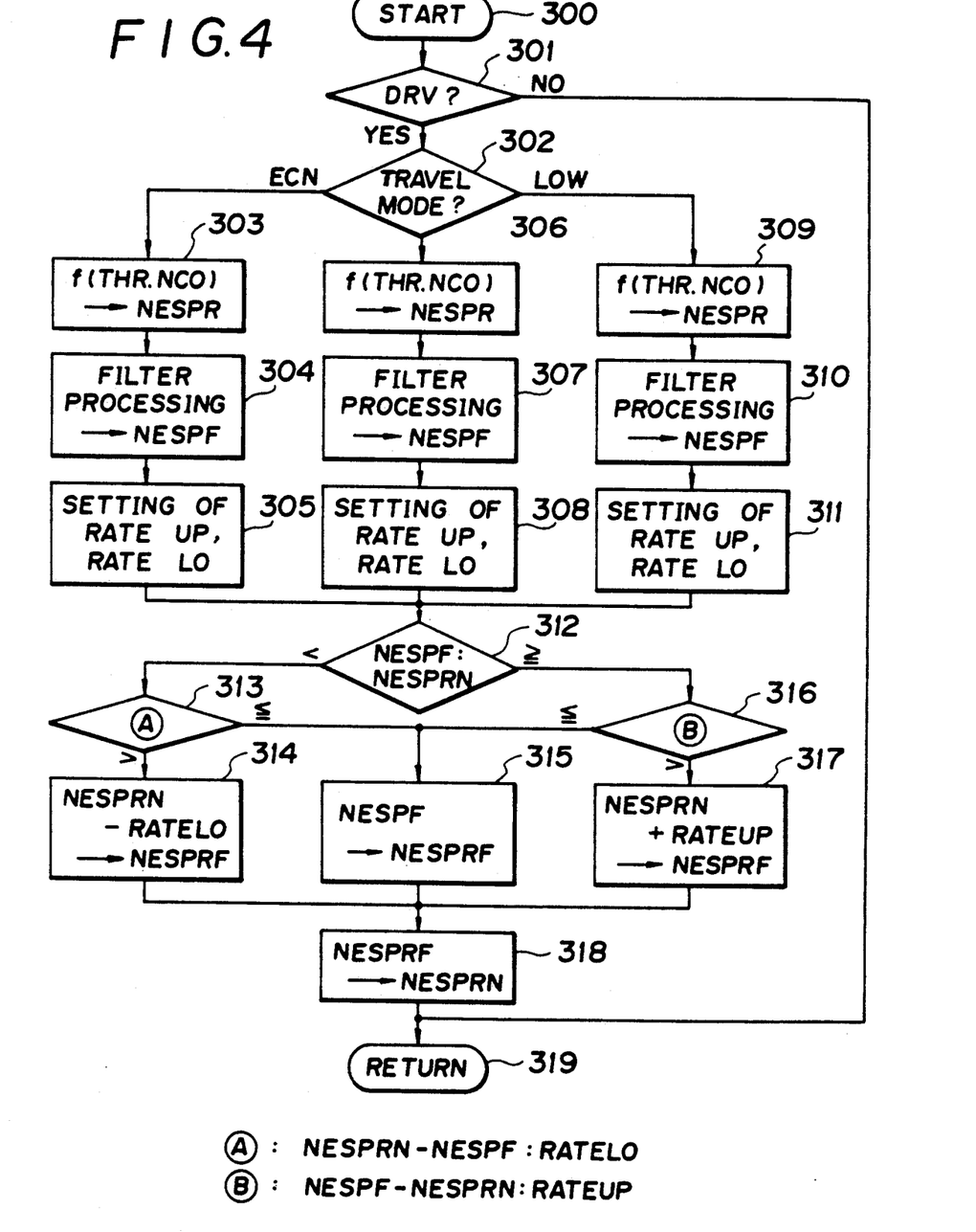
FIG. 4 is a flowchart of a program segment implementing the control function of FIG. 2.

Now, a rotational speed control by the control unit 98 will be explained according to FIG. 4.

When the control start (300), whether DRV is present or not is checked (301). In the case of YES, namely during cruising travel of the vehicle, the particular travel mode is checked (302). In decision 302, in the case of ECN, NESPF is determined (303) from the ECN speed change schedule map based on the values of THR and NCO, and then is filtered to obtain NESPF (304), and then RATEUP and RATELO are set for ECN (305).

In the decision 302, in the case of POW, NESPR is determined (306) from the speed change schedule map for POW based on the values of THR and NCO, and then is filtered to obtain NESPR (307), and then RATEUP and RATELO are set for POW (308).

In the decision 302, in the case of LOW, NESPR is determined (309) from the speed change schedule map for LOW based on the values of THR and NCO, and then is filtered to obtain NESPF (110), and then RATEUP and RATELO are set for LOW (311).

Then, a comparison of NESPR and NESPRN is effected (312). Namely, NESPF is compared with NESPRN to decide whether NESPRF is increasing or decreasing.

In step 312, if NESPF<NESPRN, NESPRF is decreasing. In this case, NESPRN−NESPF is compared to RATELO (313), and if NESPRN−NESPRF->RATELO, the RATE of NESPRF is limited to be RATELO (314). If NESPF−NESPRN≦RATELO, the RATE of NESPRF is defined to be NESPF as it is (315).

In the decision of step 312, if NESPF≧NESPRN, NESPRF is increasing. In this case, NESPF−NESPRN is compared to RATEUP (316), and if NESPF−NESPRN>RATEUP the RATE of NESPRF is limited to be RATEUP (317). If NESPF−NESPRN≦RATEUP, the RATE of NESPRF is defined to be NESPF (315).

The value of NESPRF used in the respective step 314, 315 or 317 is replaced by the value NESPRN at 318, and program control is returned (319).

In the decision of step 301, in the case of a NO, control jumps to step 319.

In this way, when the target number NESPR of revolutions of the engine determined by the speed change schedule map (based on the opening of the throttle THR and the speed of the vehicle NCO) is changed during travel of the vehicle, the RATE of change over time of the target number of revolutions of the engine NESPR is controlled to be no larger than the prescribed RATE LIMIT by the control unit 98 so that, when the target number of revolutions of the engine is changed according to a change in travel mode or a change in the throttle opening during travel of the vehicle, the actual number of revolutions of the engine can be prevented from being abruptly changed.

Therefore, an uneasy feeling as if the vehicle had slipped is not given to the driver, the power performance is improved, and the generation of shocks or noise due to a quick opening of the throttle is avoided. A deterioration in the filter response characteristic by lowering of the conventional value of the filter can be avoided, to improve the response characteristic and cancel the inconvenience of applying an uneasy feeling to the driver.

When the RATEUP and RATELO limits are set for each travel mode, a travel feeling suitable for the respective travel mode can be realized. When the driver operates the throttle THR the same amount, the driver expects a larger change in the engine speed or the power performance at the time of a low speed than at the time of a high speed. A difference between the travel modes remarkably appears at the time of a low speed. Especially, in a manual speed change vehicle, at the time of operating the throttle during travel, since the speed of the vehicle is lower, the engine speed change is larger. Therefore, in the transmission according to the invention, RATEUP and RATELO are set based on the map of vehicle speed NCO as shown in FIG. 5, and then a natural feeling can be given to the driver and a waste free speed change performance can be obtained.

Therefore, a more accurate control can be attained by setting the prescribed rate of change of the target number of revolutions of the engine for every travel mode and a more natural feeling can be given to the driver by determining the prescribed rate of change of the target number of revolutions of the engine based on the speed of the vehicle.

According to the present invention, it is not necessary to add new hardware to an existing system, but only to change software, and in a manner so that a conventional program can be substantially used, thereby reducing the amount of increase in the memory in a control unit to prevent costs from being wastefully increased, and thereby realizing an economical advantage.

As explained above in detail, according to the present invention when the target number of revolutions of the engine determined by a speed change schedule map (based on the opening of the throttle and the speed of the vehicle) is changed during travel of the vehicle, the rate of change of this target number of revolutions of the engine can be controlled so as to be lower than a prescribed rate of change by the control means, whereby when the target number of revolutions of the engine is changed according to a change in travel mode or according to a change in throttle opening or the like during travel of the vehicle, the actual number of revolutions of the engine can be prevented from being rapidly changed.

In this way, when the target number of revolutions of the engine is changed during travel of the vehicle, the actual number of revolutions of the engine is prevented from being abruptly changed, thereby avoiding application to the driver of an uneasy feeling as if the vehicle has slipped, improving the power performance, and reducing the generation of shocks or rapid opening of the throttle. The deterioration in the response characteristic caused by lowering the values of the conventional filter can be avoided in order to improve the response characteristic and synchronize the driving operation with the movement, thereby avoiding the inconvenience of applying an uneasy feeling to the driver.

The prescribed rate of change of the target number of revolutions of the engine is set separately for every travel mode to effect more accurate control, and the prescribed rate of change of the target number of revolutions of the engine is decided based on the speed of the vehicle so that a natural feeling is applied to the driver.

Further, it is not necessary to add new hardware, but only to change the software, and in fact the conventional program can for the most part be used, thereby reducing the amount of increase in the memory of the control unit, preventing costs from being wastefully increased, and realizing an economical advantage.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A revolution controller for a continuously variable transmission for a vehicle, the transmission including a driving side pulley and a driven side pulley each having a fixed pulley part and having a movable pulley part supported for movement toward and away from the fixed pulley part, the width of a groove between the pulley parts of each said pulley being increased and decreased to increase and decrease at each said pulley a rotating radius of a belt wound around both of the pulleys to change a belt ratio, said controller limiting the rate of change of a target number of revolutions for an engine driving said transmission to a rate of change of engine revolution limit lower than a prescribed rate when the target number of revolutions of the engine specified by a speed change schedule map based on a throttle opening and a vehicle speed is changed during travel of the vehicle.

2. An apparatus comprising: a continuously variable transmission, an engine drivingly coupled to said continuously variable transmission, first means for determining a target number of engine revolutions based on predetermined operating conditions, second means responsive to a change in said target number of revolutions for changing an actual number of revolutions of said engine to conform to said target number of revolutions, said second means including means for preventing a rate of change of said actual number of revolutions from exceeding a rate limit.

3. An apparatus as recited in claim 2, including third means for setting said rate limit to a respective predetermined value for each of a plurality of different operating modes.

4. An apparatus as recited in claim 2, wherein said rate limit has a first value when said actual number of engine revolutions is increasing and a second value where said actual number of engine revolutions is decreasing.

* * * * *